Patented Dec. 15, 1953

2,662,876

UNITED STATES PATENT OFFICE 2,662,876

METHOD OF TERMINATING THE POLYMERIZATION OF MONOMERIC MATERIALS IN AQUEOUS EMULSION AND A NONSTAINING, NONDISCOLORING COMPOSITION FOR USE THEREIN

George J. Antlfinger, Akron, Ohio, assignor to The B. F. Goodrich Company, New York, N. Y., a corporation of New York No Drawing. Application March 29, 1951, Serial No. 218,258

9 Claims. (Cl. 260—82.7)

This invention relates to the polymerization of olefinically-unsaturated monomeric materials, particularly butadiene-1,3 hydrocarbons, in aqueous emulsion, and pertains directly to a method of terminating or "shortstopping" such polymerizations at any desired point short of completion and to a new non-staining, non-discoloring composition for use in shortstopping polymerizations.

In the production of synthetic polymers by the polymerization of monomeric materials in aqueous emulsion it is of considerable importance to be able to terminate the polymerization reaction in the most efficient manner and at any desired time. For example, in the production of synthetic rubber by the polymerization of a monomeric butadiene-1,3 hydrocarbon in admixture with a copolymerizable monomer such as styrene or acrylonitrile, it is generally advantageous to terminate the polymerization reaction before its completion in order to obtain synthetic rubbers of the most desirable properties. Also, in the production of synthetic resins by the polymerization of monoolefinic monomers such as vinyl chloride, alkyl acrylates, acrylonitrile, etc. it very often is desirable rapidly to terminate the polymerization reaction as an emergency measure. It is also necessary to protect the synthetic rubber or resin in the latex during any subsequent stripping operations, wherein residual unreacted monomers are removed, in order to prevent further polymerization which manifests itself, in the case of synthetic rubber latices, by increased toughness and increase in insoluble polymer (or gel) content in synthetic rubber and, in synthetic resin latices, by lower average molecular weight and non-homogeneity of the resin.

Termination of polymerization reactions has been accomplished heretofore by use of a great variety of compounds such as hydroquinone, quinone, and other quinoid-type compounds, phenyl-beta-naphthylamine, and others. However, there is considerable need for a more effective, more widely useful polymerization shortstop or terminator. To illustrate, in low-temperature polymerization utilizing powerful oxidation-reduction catalysts, as is involved in the manufacture of the butadiene styrene copolymer synthetic rubbers now popularly referred to as "cold rubber," considerable difficulty has been encountered in shortstopping the polymerization reaction, particularly when only 50 to 80% of the total monomers have reacted, by use of the conventional agents such as hydroquinone. Dinitrochlorobenzene has been utilized with some success as a shortstop for cold rubber but has the disadvantages of producing noticeable discoloration of the rubber and of being water-insoluble and so toxic in nature as to be a serious health hazard to workers engaged in the various steps of synthetic rubber manufacture. Other agents have to be employed in such large amounts as to be uneconomical and to cause staining and discoloring problems in the final synthetic rubber articles.

Accordingly, it is the principal object of this invention to provide a method whereby polymerization of a wide variety of monomeric materials in aqueous emulsion may be effectively terminated regardless of the specific polymerization conditions employed and even when only a relatively small proportion of the total monomer has polymerized. Another object is to provide materials which are effective in very small amounts for terminating emulsion polymerization reactions so completely and efficiently as to prevent further reaction during subsequent processing steps and which do not stain or discolor the polymer in ultimate end-use. It is a more specific object of this invention to provide a method of and materials for effectively terminating the polymerization of butadiene-1,3 hydrocarbons in aqueous emulsion, particularly when carried out at low temperatures in the presence of oxidation-reduction or free-radical catalysts.

I have found that the polymerization in aqueous emulsion of monomeric vinylidene compounds, including monomeric materials comprising a butadiene-1,3 hydrocarbon both with and without other copolymerizable monomeric materials and also including monoolefinic monomers such as vinyl chloride, vinylidene chloride, acrylonitrile, etc., is efficiently terminated by the addition to the emulsion at any desired stage of polymerization, of a combination of substances comprising (1) a compound selected from the class consisting of sulfur and sulfur donors, as hereinafter defined, and (2) a water-soluble salt of a dithiocarbamic acid.

The substances utilizable as the first component of the shortstopping combination include elemental sulfur itself in its various forms and organic and inorganic sulfur compounds, referred to as sulfur "donors," which readily break down to yield elemental sulfur. Typical examples of organic sulfur donors include the thiuram polysulfides such as tetramethyl thiuram disulfide ("Methyl Tuads"), tetraethyl thiuram disulfide ("Ethyl Tuads"), the commercial mixtures of tetramethyl and tetraethyl thiuram disulfides, dipentamethylene thiuram tetrasulfide ("Tetrone A"), tetraethyl thiuram tetrasulfide and others; the xantnogen di- and tetra-sulfides such as ethyl xanthogen disulfide, ethyl xanthogen tetrasulfide, isopropyl xanthogen disulfide, isopropyl xanthogen tetrasulfide, isobutyl xanthogen tetrasulfide and others; the polythioamines such as N,N' - trithiodiethylamine, N,N' - trithiodibutylamine, N,N'-trithiodimorpholylamine, N,N'-tetrathiomorpholine and others; and the heavy metal salts of dithioacids such as zinc dithiofurorate and others. Typical inorganic sulfur-donors include the water-soluble polysulfides such as the sodium, potassium and ammonium polysulfides which are stable in aqueous solution and sodium hyposulfite (Na₂S₂O₄). Sulfur itself and sodium polysulfide because of their extremely low cost and excellent shortstopping activity are much preferred.

The substances utilizable as the second component of the short-stopping combination are water-soluble salts of dithiocarbamic acids. Such compounds possess the general structure

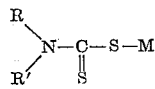

wherein R and R' are selected from the class consisting of hydrogen atoms and acyclic, alicyclic and aromatic substituent groups and M is selected from the class consisting of alkali-metal atoms and the ammonium and amine groups. Typical examples of these compounds include sodium, potassium, lithium and ammonium dithiocarbamates, sodium methyl dithiocarbamate, sodium dimethyl dithiocarbamate, sodium diethyl dithiocarbamate, ammonium pentamethylene dithiocarbamate, potassium dimethyl dithiocarbamate, sodium dibutyl dithiocarbamate, sodium dicyclohexyl dithiocarbamate, sodium diphenyl dithiocarbamate, tetraethylene pentamine dithiocarbamate and the like. The sodium, potassium, lithium, ammonium and amine salts of dialkyl dithiocarbamic acids in which the alkyl groups contain from 1 to 4 carbon atoms are more active in the shortstopping combination of this invention and accordingly are preferred, sodium dimethyl dithiocarbamate being the most proficient in this respect.

The new shortstopping combination and the method employing it are applicable generally to the polymerization of emulsion polymerizable unsaturated organic compounds which contain the vinylidene, CH₂=C< group, known generically as vinylidene compounds. Such compounds contain a terminal methylene group attached by a double bond to a carbon atom and undergo addition polymerization to produce predominantly linear polymers. Examples of such compounds include monoolefinic emulsion - polymerizable, vinyl and vinylidene compounds such as vinylidene chloride, vinyl chloride, methyl acrylate, octyl acrylate, methyl methacrylate, styrene, acrylonitrile, vinyl acetate, vinyl benzoate, isobutylene, ethylene and the like; the conjugated open-chain dienes such as the butadiene-1,3 hydrocarbons including buatdiene-1,3, isoprene, 2,3-dimethyl butadiene-1,3, etc.; chloroprene, 3-cyano butadiene-1,3, piperylene and others; trienes such as myrcene and others; mixtures of the above dienes with vinyl and vinylidene compounds such as vinylidene chloride, styrene, p-chlorostyrene, 3,5-dichlorostyrene, p-methoxystyrene, acrylic and alpha-alkyl acrylic acids, their esters, nitriles, and amides such as acrylic acid, methacrylic acid, methyl acrylate, octyl acrylate, methyl methacrylate, lauryl methacrylate, acrylonitrile, alpha-chloroacrylonitrile, methacrylonitrile, dimethyl acrylamide, vinyl pyridine, vinyl benzoate, vinyl acetate, vinyl ketones and vinyl ethers, vinyl carbazole, vinyl furane and other compounds copolymerizable with the dienes such as isobutylene, diallyl maleate, 1,4-divinylbenzene and others; and compounds containing both olefinic and acetylenic bonds such as vinyl acetylene, vinyl ethynyl carbinol and the like. The above vinylidene compounds may be copolymerized with one another or with still other unsaturated polymerizable materials such as diethyl maleate, diethyl fumarate, maleic acid or anhydride, and others.

The method and shortstopping combination of this invention is particularly applicable to the polymerization of monomeric mixtures comprising from 50 to 95% by weight of a butadiene-1,3 hydrocarbon such as butadiene-1,3 and 5 to 50% of a mono-unsaturated vinylidene compound such as vinylidene chloride, styrene, acrylonitrile, methyl acrylate, methyl methacrylate and others and to the polymerization of monomeric materials consisting of mono-unsaturated vinylidene and vinyl compounds. Most preferred are mixtures of 50 to 90% of butadiene-1,3 and 10 to 50% of acrylonitrile or styrene and mixtures of vinylidene chloride and/or vinyl chloride with methyl acrylate, ethyl acrylate, octyl acrylate, methyl methacrylate, acrylonitrile, vinyl acetate, vinyl benzoate and others.

It will be understood from the above examples that vinyl compounds are a sub-genus of vinylidene compounds since they contain the characteristic CH₂=C< structure, one of the free valences being connected to hydrogen to form the vinyl

In the practice of this invention an aqueous emulsion containing monomeric material, for example, a butadiene-1,3 hydrocarbon, undergoing polymerization, and also containing the usual polymerization promoting materials such as an anionic or cationic emulsifier, a polymerization catalyst such as a peroxygen compound and, if desired, a polymerization modifier or a buffer salt or other additive, is treated at any desired time prior to completion of the polymerization reaction, preferably when between about 20 and about 85% of the monomer has been converted to polymer, with a small amount of the combination shortstop, either by adding a mixed aqueous solution containing both ingredients of the combination, such as an aqueous solution of sodium polysulfide and a sodium dithiocarbamate, or by adding separate solutions of each component, for example, a separate solution of sulfur in styrene, toluene, benzene or ethyl ether and an aqueous solution of the alkali salt of a dithiocarbamic acid. The effect of the addition of the combination shortstop is the abrupt and permanent cessation of the polymerization reaction even when the conversion of monomer to polymer is below 50% and when only a minute quantity of the combination is employed.

When added to a synthetic rubber producing polymerization, the synthetic rubber in the latex does not increase appreciably in gel content, intrinsic viscosity, and Mooney viscosity and the latex total polymer solids does not increase during any subsequent, stripping, concentration, coagulation, filtering and drying operations. Moreover, the raw rubbery polymer does not become as tough upon accelerated oven aging as do synthetic rubbers prepared with other shortstopping agents. After addition of the combination shortstop the polymer latex or emulsion may be allowed to stand or be handled at any desired temperature, as in the stripping operation where residual monomers are removed by steam stripping under vacuum, without danger of further polymerization. In fact, the polymer upon crude aging for as much as 2 months in a warehouse shows no increase in raw polymer Mooney viscosity while similar polymers prepared with other conventional shortstopping agents are appreciably tougher after storage. In addition, the polymer is of maximum plasticity obtainable from the polymerization recipe employed. it is non-staining and non-discoloring and when properly vulcanized is possessed of high tensile strength, modulus and elongation and possesses good flexibility.

Only very small amounts of each of the components of the combination shortstop of this invention need be employed. Sulfur itself, the various sulfur-donor substances and the alkali salts of dithiocarbamic acids listed above have more or less of a shortstopping or terminating action when used singly but amounts as large as 0.2% to 1.0% or more, based on the initial monomer content of the emulsion, are required. Because such large amounts are required their use results in undesirable side-effects such as extremely bad staining and discoloring, and the raw polymer shows considerable resinification or precure, and has poor storage stability. When combined according to this invention, only 0.01 to 0.10% of sulfur or an amount of sulfur-donor equivalent to such amount of sulfur and only 0.01 to 0.10% of the alkali salt of a dithiocarbamic acid, more preferably 0.01 to 0.05% by weight of sulfur or its equivalent and 0.01 to 0.05 of the alkali salt of a dithiocarbamic acid, need be utilized. The use of these quantities in combination are at least several times as effective as a similar or larger quantity of either component used singly and moreover, results in non-staining and non-discoloring rubbers of excellent stability during compounding and storage.

*Example 1*

To illustrate the method of this invention an aqueous emulsion of monomeric butadiene-1,3 and styrene, for polymerization to produce "cold rubber," is prepared from the following ingredients in the following ratios:

| | Parts/wt. |
|---|---|
| Butadiene-1,3 | 72.0 |
| Styrene | 28.0 |
| Cumene hydroperoxide | 0.1 |
| t-dodecyl mercaptan | 0.2 |
| Emulsifier #1* | 4.5 |
| Emulsifier #2** | 0.1 |
| Trisodium phosphate | 0.5 |
| Sugar ("Cerelose") | 1.0 |
| $FeSO_4 \cdot 7H_2O$ | 0.12 |
| $K_4P_2O_7$ | 0.20 |
| Water (soft) | 200.00 |

* Sodium salt of disproportionated abietic acid known as "Dresinate 731."
** An alkyl aryl sulfonate known as "Tamol N."

The reaction mixture is agitated 41° F. until approximately 60% of the monomers have polymerized at which time the resulting latex is divided into several samples each representing the latex obtaining from 100 parts of monomers. To one such sample there are added a solution of sulfur in styrene containing 0.05 part of sulfur and an aqueous solution containing 0.03 part of sodium dimethyl dithiocarbamate. To another latex sample 0.125 part of dinitrochlorobenzene and 0.04 part of sodium nitrite (as aqueous solution) are added. To each latex sample 1.25% by weight of phenyl beta-naphthylamine is added as an antioxidant. The latex in each case is stripped of its residual monomeric materials by distillation under vacuum. The latex samples are then coagulated, the wet coagulum sheeted out on a wash mill and dried in an oven. The synthetic rubber obtained from the latex shortstopped with sulfur and sodium dimethyl dithiocarbamate has a Mooney viscosity, as determined by the Mooney viscosimeter using the 1.500 inch rotor (M. L.) after four minutes at 212° F., of 48, 0% gel, and an intrinsic viscosity of 1.58 while synthetic rubber obtained using the dinitrochlorobenzene and sodium nitrite has a Mooney viscosity of 62 M. L. and an intrinsic viscosity of 1.82. In addition, the rubber prepared with the combination of sulphur and sodium dimethyl dithiocarbamate has a non-staining and non-discoloring rating superior to the rubber prepared with the dinitrochlorobenzene sodium nitrite combination.

Using another sample of the latex and employing only 0.02 part of sodium dimethyl dithiocarbamate with 0.05 part of sulfur, the Mooney viscosity of the raw rubber is only 53, the intrinsic viscosity is 1.66 and the non-discoloring rating is further improved. Still another sample of the latex, to which is added 1.25% of heptylated diphenylamine as antioxidant, is treated first with a styrene solution containing 0.1 part of sulfur and then with 0.05 part of sodium dimethyl dithiocarbamate in aqueous solution. The resulting latex is found not to increase in polymer solids content during steam stripping under vacuum (an indication of the shortstopping efficiency) and the rubber derived by coagulation of the latex is found to have a Mooney viscosity of 43, 0% gel, and an intrinsic viscosity of 1.42. When another sample of the same latex is treated with 0.10 part of sulfur alone the latex solids content rises 14.8% (showing that the reaction was not terminated) and the rubber derived from the latex has a Mooney viscosity of 75.2% gel content and an intrinsic viscosity of 1.86. Similarly, 0.2 part of each of the following are added to still other separate samples of the latex: (1) a mixture consisting of 85% by weight of 4,5-dimethyl mercapto thiazole and 15% of 4-ethyl mercapto thiazole (known as "Goodrite Texas"), (2) the zinc salt of "Goodrite Texas," (3) diisopropyl xanthogen disulfide, and (4) tetramethyl thiouram disulfide. The results are as follows:

| Sample | Short-stopped Mooney (M. L.) | Total solids rise, Percent | Percent gel | I. V. |
|---|---|---|---|---|
| 1 | 76 | 4.0 | 4 | 1.84 |
| 2 | 74 | 6.0 | 8 | 1.97 |
| 3 | 76 | 14.0 | 7 | 1.96 |
| 4 | 68 | 4.0 | 5 | 1.81 |

From the foregoing, it is readily apparent that the use of only 0.05 to 0.10 part by weight each of sulfur and sodium dimethyl dithiocarbamate is much more effective as a polymerization terminator than larger quantities of many of the conventional shortstopping agents.

Similar results are obtained by substituting for the sodium dimethyl dithiocarbamate of the example such materials as ammonium dithiocarbamate, sodium methyl dithiocarbamate, sodium dicyclohexyl dithiocarbamate, tetraethylene pentamine dithiocarbamate, and others. In place of sulfur or sodium polysulfide there may be utilized such materials as sodium hyposulfite, tetramethyl or tetraethyl thiuram disulfides, dipentamethylene thiuram tetrasulfide, isopropyl xanthogen tetrasulfide, N,N'-trithiodiethylamine, and zinc dithiofurorate.

*Example 2*

As a further illustration of the method of this invention a butadiene styrene "cold-rubber" latex prepared as in Example 1 is treated at 60% conversion with an aqueous solution containing 0.05 part of sulfur as sodium polysulfide and 0.03 part of sodium dimethyl dithiocarbamate as a shortstop and then with 1.25% by weight of heptylated diphenylamine as an antioxidant. The resulting shortstopped and stabilized latex is steam stripped and coagulated to obtain a soft plastic synthetic rubber having a Mooney viscosity (M. L.) of 47, 0% gel, and an intrinsic viscosity of 1.46. A second sample of synthetic rubber but made using a shortstop consisting of 0.15 part of dinitrochlorobenzene and 0.04 part of sodium nitrite has a Mooney viscosity (M. L.) of 51, 2% gel content and an intrinsic viscosity of 1.59. When however, the two samples are subjected to the Brabender Plastograph test (the latter being in effect a small Banbury mixer) at 300° F. for 20 minutes the polysulfide-dithiocarbamate treated rubber does not increase in gel content while the dinitrochlorobenzene rubber increases by 4% in gel content. Thus the sodium polysulfide sodium dimethyl dithiocarbamate combination is a more effective shortstop than the dinitrochlorobenzene sodium nitrite combination (the latter being among the best of known shortstops) and has the additional advantage of being completely water-soluble and non-toxic in use.

*Example 3*

As another illustration of the method of this invention, the combination shortstop is applied to a polymer of butadiene and styrene prepared by polymerization at 50° C. in an aqueous emulsion containing the following ingredients:

| | Parts/wt. |
|---|---|
| Butadiene-1,3 | 75.00 |
| Styrene | 25.00 |
| Sodium hydroxide pellets | 0.15 |
| Dodecyl mercaptan | 0.475 |
| Sodium persulfate | 0.25 |
| Fatty acid soap | 4.30 |
| Water | 180.00 |

The polymerization is carried on until approximately 70% of the monomers are converted to polymer at which time separate samples of the latex each resulting from 100 parts of monomers, are treated with various shortstopping agents. One latex sample is treated with a solution of 0.05 part of sulfur in styrene and an aqueous solution containing 0.05 part of sodium dimethyl dithiocarbamate, a second with an aqueous solution containing 0.08 part of sulfur (as sodium polysulfide) and 0.08 part of sodium dimethyl dithiocarbamate, and a third with 0.15 part of sodium sulfide. All three latex samples are then stripped of residual unreacted monomers by steam distillation under vacuum. The first and second latex samples show substantially no increase in latex polymer solids after stripping and the rubber derived by their coagulation has a Mooney viscosity of 33 (M. L.) while the third latex sample shows an increase of 23.3% in total polymer solids content and the rubber derived therefrom has a Mooney of 60 (M. L.). In addition, the rubbers obtained from the first and second latex samples have a better non-staining non-discoloring rating than that of the sodium sulfide shortstopped rubber, although the latter is the best of the heretofore known non-staining, non-discoloring shortstops.

*Example 4*

The method of this invention is also applicable to a latex of a butadiene-1,3 methyl methacrylate copolymer rubber such as is prepared from a reaction medium having the following composition:

| | Parts/wt. |
|---|---|
| Butadiene | 60.0 |
| Methyl methacrylate | 40.0 |
| Water | 180.0 |
| Dresinate | 4.70 |
| Tamol N | 0.70 |
| Sodium hydroxide | 0.160 |
| Potassium chloride | 0.500 |
| FeSO$_4$·7H$_2$O | 0.140 |
| K$_4$P$_2$O$_7$ | 0.177 |
| Cerelose | 1.00 |
| t-dodecyl mercaptan | 0.275 |
| Cumene hydroperoxide | 0.100 |

The reaction is conducted at 41° F. until approximately 70% of the monomers have reacted. At the latter point an aqueous solution containing 0.05 part of sulfur as sodium polysulfide and 0.03 part of sodium dimethyl dithiocarbamate is added to the latex followed by the addition of 1.25% by weight of heptylated diphenylamine as an aqueous dispersion. The soft plastic rubber obtained by coagulation of the resulting latex has a raw Mooney viscosity of 70 M. L. The 5 minute and 10 minute Mooney viscosity in the Plastograph is 30 M. L. and after 10 minutes still has 0% gel and an intrinsic viscosity of 1.21. The latter results show that the polysulfide sodium dimethyl dithiocarbamate combination is a very efficient shortstopping agent for this system. Hydroquinone or phenyl-beta-naphthylamine even in amounts as large as 0.2 to 0.3 part are not effective shortstops for this type of cold rubber.

*Example 5*

The shortstopping combination of this invention is applicable also to a butadiene acrylonitrile copolymer latex such as is prepared by polymerization at 35° C. of the monomers in a reaction medium having the following composition:

| | Parts/wt. |
|---|---|
| Butadiene | 55.0 |
| Acrylonitrile | 45.0 |
| S. F. flakes (fatty acid soap) | 5.0 |
| Diisopropyl xanthogen disulfide | 0.75 |
| Hydrogen peroxide | 0.35 |
| Tamol N | 1.00 |
| Fe$_2$(SO$_4$)$_3$ | 0.025 |
| COCl$_2$ | 0.00125 |
| Na$_4$P$_2$O$_9$ | 0.145 |

The polymerization reaction is terminated at approximately 70% conversion by the addition of an aqueous solution containing 0.10 part of sulfur as sodium polysulfide and 0.10 part of sodium dimethyl dithiocarbamate. The latex is then stabilized by the addition of 1.25% by weight of heptylated diphenylamine as an antioxidant.

The latex is then stripped of residual monomers and coagulated to obtain a readily processable rubber having a Mooney viscosity (M. S.) of 80 (using the 1.200 inch rotor after 4 minutes at 212° F.). When the sulfur-carbamate shortstop is omitted a rubber is obtained having a Mooney viscosity of 151 M. S.

*Example 6*

The polymerization reaction in the production of synthetic resins by the polymerization in aqueous emulsion of mono-unsaturated vinylidene and vinyl compounds also is efficiently terminated by the combination shortstop of this invention. For example, the addition of equal 0.05 part (based on 100 parts of monomers used in the polymerization) portions of sulfur as sodium polysulfide and sodium dimethyl dithiocarbamate efficiently terminates the polymerization of vinyl chloride in the production of polyvinyl chloride after only 20 to 50% of the vinyl chloride has polymerized. Similar quantities of the shortstop combination effectively kills the polymerization reaction of vinylidene chloride and acrylonitrile, the reaction of vinylidene chloride, vinyl chloride and ethyl acrylate, the reaction of vinylidene chloride and vinyl chloride, and the reaction of vinyl chloride and ethyl acrylate. The prompt cessation of the polymerization of these mono-unsaturated vinylidene and vinyl compounds is a very useful safety measure when the supply of cooling water or electric power for agitation fails unexpectedly, the addition of the shortstop combination very effectively preventing a runaway reaction and the development of dangerously high pressures. In the case of the polymerization of mixtures containing vinylidene chloride or vinyl chloride and a water-soluble monomer such as acrylonitrile it is difficult to prevent the further polymerization of the acrylonitrile after the polymer latex has been discharged from the reaction vessel. The shortstop combination of this invention, however, effectively prevents the after-polymerization of acrylonitrile.

While I have disclosed certain preferred manners of performing my invention, I do not thereby desire or intend to limit myself solely thereto, for the precise proportions of the materials utilized may be varied and equivalent chemical materials may be employed, if desired, without departing from the spirit and scope of the invention as defined by the appended claims.

I claim:

1. The method of terminating the polymerization of a monomeric material in aqueous emulsion comprising a butadiene-1,3 hydrocarbon which comprises adding to said emulsion after the beginning of the polymerization and prior to completion thereof, a combination of substances consisting of (1) a solution of an agent selected from the class consisting of sulfur, alkyl thiuram polysulfides, alkyl xanthogen polysulfides and water-soluble inorganic polysulfides and (2) an aqueous solution of a water-soluble salt of a dithiocarbamic acid, substance (1) being added in amounts equivalent to from 0.01 to 0.10% by weight of sulfur and substance (2) being added in amounts of from 0.01 to 0.10% by weight, based on the weight of monomer initially present in said emulsion.

2. The method of terminating the polymerization of a monomeric material comprising butadiene-1,3 in aqueous emulsion which comprises adding to said emulsion after the beginning of polymerization and prior to completion thereof, a combination of substances consisting of (1) a solution of sulfur in an organic solvent and (2) an aqueous solution of an alkali-metal salt of a dialkyl dithiocarbamic acid, said substances being added in amount from 0.01 to 0.10% by weight each based on the weight of monomer initially present in said emulsion.

3. The method of terminating the polymerization of a monomeric material comprising butadiene-1,3 in aqueous emulsion which comprises adding to said emulsion after the beginning of polymerization and prior to completion thereof, an aqueous solution containing a combination of substances consisting of (1) a water-soluble inorganic polysulfide stable in aqueous solution and (2) an alkali-metal salt of a dialkyl dithiocarbamic acid, substance (1) being added in an amount equivalent to from 0.01 to 0.10% by weight of sulfur and substance (2) being added in amounts of from 0.01 to 0.10% by weight, both based on the weight of monomer initially present in said emulsion.

4. The method of claim 3 in which the monomeric material comprises a mixture of butadiene-1,3 and styrene.

5. The method of claim 3 in which the monomeric material comprises a mixture of butadiene-1,3 and acrylonitrile.

6. The method of claim 3 in which the inorganic, water-soluble polysulfide is sodium polysulfide and the alkali-metal salt of a dithiocarbamic acid is sodium dimethyl dithiocarbamate.

7. The method of terminating the polymerization of a monomeric mixture of butadiene-1,3 and styrene in aqueous emulsion which comprises adding to said emulsion after the beginning of polymerization and prior to completion thereof a solution of sulfur in monomeric styrene and an aqueous solution of sodium dimethyl dithiocarbamate, said sulfur and said sodium dimethyl dithiocarbamate being added in amounts from 0.01 to 0.10% by weight each based on the weight of monomers initially present in said emulsion.

8. A polymerization terminating agent consisting of an aqueous solution containing an inorganic water-soluble polysulfide stable in aqueous solution and (2) a water-soluble salt of a dithiocarbamic acid, said two components being present in a ratio of about 10 to 90% equivalent to sulfur of (1) and 90 to 10% of (2).

9. A polymerization terminating agent consisting of an aqueous solution of (1) sodium polysulfide and (2) sodium dimethyl dithiocarbamate, said two components being present in a ratio of about 10 to 90% equivalent to sulfur of (1) and 90 to 10% of (2).

GEORGE J. ANTLFINGER.

References Cited in the file of this patent

UNITED STATES PATENTS

| Number | Name | Date |
|---|---|---|
| 2,234,215 | Youker | Mar. 11, 1941 |
| 2,376,350 | Fryling | May 22, 1945 |
| 2,469,017 | Sundet | May 3, 1949 |
| 2,574,020 | Crouch | Nov. 6, 1951 |
| 2,602,078 | Schulze et al. | July 1, 1952 |

OTHER REFERENCES

India Rubber World, July 1949, page 476.
Kluchesky et al., Ind. and Eng. Cheml., vol. 41, No. 8, August 1949, pp. 1768–1770.